United States Patent
Inagaki et al.

(10) Patent No.: US 9,689,505 B2
(45) Date of Patent: Jun. 27, 2017

(54) VALVE REMOTE CONTROL APPARATUS

(71) Applicant: YOKOGAWA ELECTRIC CORPORATION, Musashino-shi, Tokyo (JP)

(72) Inventors: Tetsuo Inagaki, Musashino (JP); Hitoshi Saito, Musashino (JP)

(73) Assignee: Yokogawa Electric Corporation, Tokyo (JP)

( * ) Notice: Subject to any disclaimer, the term of this patent is extended or adjusted under 35 U.S.C. 154(b) by 88 days.

(21) Appl. No.: 14/402,987

(22) PCT Filed: May 20, 2013

(86) PCT No.: PCT/JP2013/063954
§ 371 (c)(1),
(2) Date: Nov. 21, 2014

(87) PCT Pub. No.: WO2013/176086
PCT Pub. Date: Nov. 28, 2013

(65) Prior Publication Data
US 2015/0184772 A1    Jul. 2, 2015

(30) Foreign Application Priority Data

May 23, 2012  (JP) .................................. 2012-117719
Feb. 19, 2013  (JP) .................................. 2013-029888

(51) Int. Cl.
*F16K 31/48*    (2006.01)
*F16K 31/42*    (2006.01)
(Continued)

(52) U.S. Cl.
CPC .............. *F16K 31/42* (2013.01); *F15B 20/00* (2013.01); *F16K 31/14* (2013.01); *F16K 31/60* (2013.01);
(Continued)

(58) Field of Classification Search
CPC ...... F16K 37/0041; F16K 31/14; F16K 31/60; F16K 37/00; F15B 2211/857;
(Continued)

(56) References Cited

U.S. PATENT DOCUMENTS 3,670,274 A * 6/1972 Ellison ................ F16K 31/0627
251/129.21
4,979,067 A † 12/1990 Foley
(Continued)

FOREIGN PATENT DOCUMENTS

CN    2821334 Y  †  9/2006
JP    64-46078 A     2/1989
(Continued)

OTHER PUBLICATIONS

Communication dated Dec. 11, 2015, from the European Patent Office in counterpart European Application No. 13793605.0.
(Continued)

*Primary Examiner* — Umashankar Venkatesan
(74) *Attorney, Agent, or Firm* — Sughrue Mion, PLLC (57) ABSTRACT

It is to realize a valve remote control apparatus capable of driving and controlling, with wireless signals, an air motor configuring an automatic switch to be attached to a manual valve.
A valve remote control apparatus is configured to mechanically connect, to a manual operating portion 11 of an existing manual valve 10, an output shaft 21a of an air motor 21 using an air pressure as a drive source, and to remotely control the manual value 10. The valve remote control apparatus includes a solenoid valve (operating valve 53) operated by an operation signal transmitted and received wirelessly between a contact information terminal portion 51 and a contact information operating portion 52. The air
(Continued)

pressure for driving and rotating the air motor 21 is supplied via the solenoid valve (operating valve 53).

5 Claims, 11 Drawing Sheets

(51) Int. Cl.
    *F16K 31/14*     (2006.01)
    *F16K 37/00*     (2006.01)
    *F15B 20/00*     (2006.01)
    *F16K 31/60*     (2006.01)

(52) U.S. Cl.
    CPC .......... *F16K 37/00* (2013.01); *F16K 37/0041* (2013.01); *F15B 2211/6336* (2013.01); *F15B 2211/6343* (2013.01); *F15B 2211/857* (2013.01); *Y10T 137/8242* (2015.04)

(58) Field of Classification Search
    CPC ...... F15B 2211/6336; F15B 2211/6343; Y10T 137/8242
    USPC ..................... 137/624.11, 624.12; 251/30.01
    See application file for complete search history.

(56) References Cited

U.S. PATENT DOCUMENTS

| | | | |
|---|---|---|---|
| 5,257,771 A † | 11/1993 | Portis | |
| 6,246,131 B1 † | 6/2001 | Sheng | |
| 6,262,620 B1 † | 7/2001 | Jenski | |
| 2005/0189017 A1 | 9/2005 | Eryurek | |
| 2006/0272710 A1 † | 12/2006 | Minervini | |
| 2007/0034264 A1 † | 2/2007 | Kunz | |
| 2008/0121290 A1 * | 5/2008 | Pape | F15B 19/005 137/551 |
| 2009/0306830 A1 † | 12/2009 | Cummings | |
| 2012/0031494 A1 | 2/2012 | Lymberopoulos | |
| 2012/0073670 A1 † | 3/2012 | Lymberopoulos | |
| 2015/0184772 A1 † | 7/2015 | Inagaki | |

FOREIGN PATENT DOCUMENTS

| | | |
|---|---|---|
| JP | 3-014983 A | 1/1991 |
| JP | 3-244886 A | 10/1991 |
| JP | 08-166325 † | 6/1996 |
| JP | 8-166325 A | 6/1996 |
| JP | 9-096374 A | 4/1997 |
| JP | 2000-179742 A | 6/2000 |
| JP | 2001-090673 A | 4/2001 |
| JP | 2007-522563 A | 8/2007 |
| WO | 2012/037516 A2 | 3/2012 |

OTHER PUBLICATIONS

International Search Report and Written Opinion dated Jun. 18, 2013 issued in International Application No. PCT/JP2013/063954 (PCT/ISA/210 and PCT/ISA/237).

\* cited by examiner
† cited by third party

VALVE REMOTE CONTROL APPARATUS

TECHNICAL FIELD

The present invention relates to a valve remote control apparatus and, more particularly, to an apparatus useful for remotely controlling an existing valve.

BACKGROUND ART

For example, when a disaster such as an earthquake or a tsunami occurs, a tank main valve used in a factory or plant needs to be quickly closed in order to maintain safety and prevent the drain of hazardous substances stored in a tank. If the safety of plant facilities is confirmed, so that an operation is resumed, the tank main valve is opened.

If a manual valve is provided as the tank main valve, a worker should go to the installation site of the valve and to open and close the valve by manual operations. Therefore, manual operations on the tank main valve may be impractical, depending on the scale and the configuration of the plant.

Figure 11:
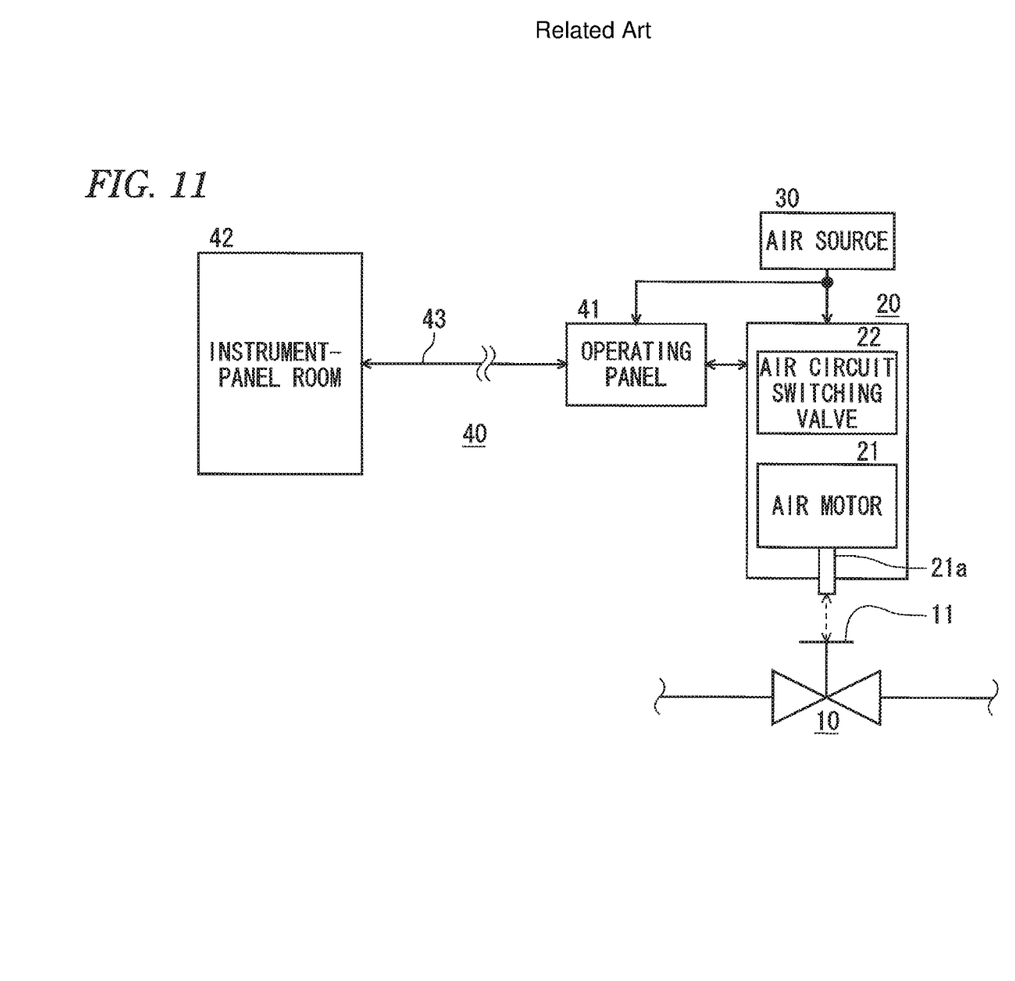
FIG. 11 is a diagram showing a configuration example of a conventional valve remote control apparatus.

Thus, it has been put into practical use to realize remote control monitoring by, e.g., adding to an existing manual valve 10 an automatic switch 20 using an air motor that uses an air pressure as a power source, as illustrated in FIG. 11.

In FIG. 11, the automatic switch 20 consists of an air motor 21 using an air pressure as a power source, and an air circuit switching valve 22 for switching the rotational direction of the air motor 21 by switching a supply circuit for an air pressure that drives the air motor 21. The output shaft 21a of the air motor 21 is mechanically connected to a manual operating portion 11 of the manual valve 10.

An air source 30, and an operating panel 41 configuring an operating system 40 of the automatic switch 20 are connected to the automatic switch 20. The air source 30 supplies a drive air pressure and a control air pressure to the automatic switch 20 and the operating panel 41, respectively.

In addition, the automatic switch 20 is provided with an opening-side limit switch adapted to be switched when the manual valve 10 reaches an opening-side limit position, a closing-side limit switch adapted to be switched when the manual valve 10 reaches a closing-side limit position, an opening-side switching valve adapted to switch the circuit for the air motor according to an air pressure from the opening-side limit switch, a closing-side switching valve adapted to switch the circuit for the air motor according to an air pressure from the closing-side limit switch, and so on (though these switches and valves are not shown).

The operating system 40 is configured by the operating panel 41, an instrument-panel room 42, a control signal line 43 connecting the operating panel 41 and the instrument-panel room 42 to each other, and so on.

The operating panel 41 is provided with a solenoid valve that performs opening and closing operations for an air pressure supplied to the air motor 21 by switching the air circuit switching valve 22 according to a solenoid valve opening signal or a solenoid valve closing signal input from the instrument-panel room 42, an operation switching valve that switches between an operation of the manual valve 10 at the installation site of the manual valve 10 by a lever operation and an operation of the manual valve 10 remotely controlled from the instrument panel room 42, an opening/closing operation valve that performs opening and closing operations for an air pressure supplied to the air motor by switching the air circuit through a lever operation, an opening-side shuttle valve that outputs a control air pressure to the opening-side switching valve of the automatic switch 20, a closing-side shuttle valve that outputs a control air pressure to the closing-side switching valve of the automatic switch 20, an opening-status indication air lamp that indicates the operating-status of the opening-side limit switch, a closing-status indication air lamp that indicates the operating status of the closing-side limit switch, and so on (though these valves and lamp are not shown).

When an operation of the operation switching valve provided on the operating panel 41 is switched to an operation remotely controlled from the instrument-panel room 42 in such a configuration, so that a solenoid valve opening signal input to the operating panel 41 from the instrument-panel room 42 is turned on, and that the solenoid valve provided on the operating panel 41 operates to an opening-side, a drive control air pressure input to the operating panel 41 from the air source 30 reaches the opening-side of the air circuit switching valve 22 via the opening-side shuttle valve and the opening-side switching valve. Consequently, the air circuit switching valve 22 is switched to the opening-side, so that the drive control air pressure input to the automatic switch 20 from the air source 30 is supplied to the opening-side of the air motor 21, and that thus, the air motor 21 is rotated to the opening-side.

When the air motor 21 reaches the opening-side limit position, so that the opening-side limit switch is switched, a limit control air pressure is transmitted to the opening-side switching valve. Thus, the opening-side switching valve is switched to a closing-side. Consequently, the drive control air pressure does not reach the air motor 21. Then, when the solenoid valve opening signal input to the operating panel 41 from the instrument-panel room 42 is turned off at an appropriate timing, the solenoid valve returns to a central position from the opening-side.

If the air motor 21 is operated to the closing-side, a solenoid valve closing signal input from the instrument-panel room 42 to the operating panel 41 is turned on. Consequently, a closing-side circuit operates, so that the air motor 21 starts to rotate to the closing-side, so that the closing-side limit switch is switched, and that an operation is stopped.

Patent Document 1 discloses technology of controlling the opening and the closing of a valve, using a wireless signal.

Patent Document 2 discloses technology of remotely controlling a valve actuator laid in a secluded place among mountains or the like, using a communications satellite.

CITATION LIST

Patent Literature

[Patent Document 1] JP-A-Hei. 3-14983
[Patent Document 1] JP-A-Sho. 64-46078

SUMMARY OF INVENTION

Technical Problem

However, in the conventional valve remote control apparatus illustrated in FIG. 11, the control signal line 43 should be laid to the operating panel 41 provided in the neighborhood of the tank main valve (manual valve) 10 from the instrument-panel room 42 as the operating system 40 for the automatic switch 20. If the number of tank main valves (manual valves) 10 serving as operation objects is large, the number of control signal lines increases depending on the number of the tank main valves (manual valves) 10. Thus, the conventional valve remote control apparatus has the problems that the control signal lines are congested, and that the maintenance and management man-hours of the control signal lines also increase.

The invention solves the problems. An object of the invention is to realize a valve remote control apparatus capable of driving and controlling, with wireless signals, an air motor configuring an automatic switch to be attached to a manual valve.

Solution to Problem

The purpose of the invention is achieved by the following configurations:

(1) A valve remote control apparatus configured to mechanically connect, to a manual operating portion of an existing manual valve, an output shaft of an air motor using an air pressure as a drive source, and to remotely control the manual value, the valve remote control apparatus comprising:

a solenoid valve operated by an operation signal transmitted and received wirelessly between a contact information terminal portion and a contact information operating portion, wherein the air pressure for driving and rotating the air motor is supplied via the solenoid valve.

(2) The valve remote control apparatus according to the above (1), wherein the contact information operating portion includes means configured to convert contact information transmitted from the contact information terminal portion into an electric signal capable of driving the solenoid valve.

(3) The valve remote control apparatus according to the above (1) or (2), wherein the solenoid valve is a double latch type solenoid valve.

(4) The valve remote control apparatus according to any one of the above (1) to (3), further comprising:

a limit detecting switch configured to detect a limit control air pressure output from a limit switch configured to detect a full-open state and a full-close state of the air motor, and to output contact information, wherein the contact information operating portion includes a contact information reading portion configured to read the contact information output from the limit detecting switch, and the contact information terminal portion includes a contact information analyzing portion configured to cause, when confirming that the contact information read to the contact information reading portion is turned on, transition of the contact information to an off-state.

(5) The valve remote control apparatus according to any one of the above (1) to (4), further comprising:

an intrinsically safety explosion-proof solenoid valve used as the solenoid valve;

a single-system voltage/current limiting portion configured to limit each of a voltage and an current, which drive a solenoid of the intrinsically safety explosion-proof solenoid valve, not to exceed a value predetermined for intrinsically safety explosion protection; and an output terminal switching portion configured to selectively connect, to a terminal of the solenoid to be driven, a predetermined output limited by the voltage/current limiting portion.

(6) The valve remote control apparatus according to any one of the above (1) to (5), further comprising at least one of:

a pressure monitor configured to measure an air pressure serving as the drive source;

a displacement sensor configured to detect displacement of the manual valve;

a temperature sensor configured to detect ambient temperature of the solenoid valve;

means configured to detect an operating sound of the air motor and to analyze acoustic information concerning the detected operating sound; and an energy harvesting function portion configured to serve as a power supply complementing a battery driving each of the portions.

Effect of Invention

According to the valve remote control apparatus of the invention, it is possible to drive and control, with wireless signals, the air motor configuring the automatic switch to be attached to the manual valve.

DESCRIPTION OF EMBODIMENTS

Figure 1:
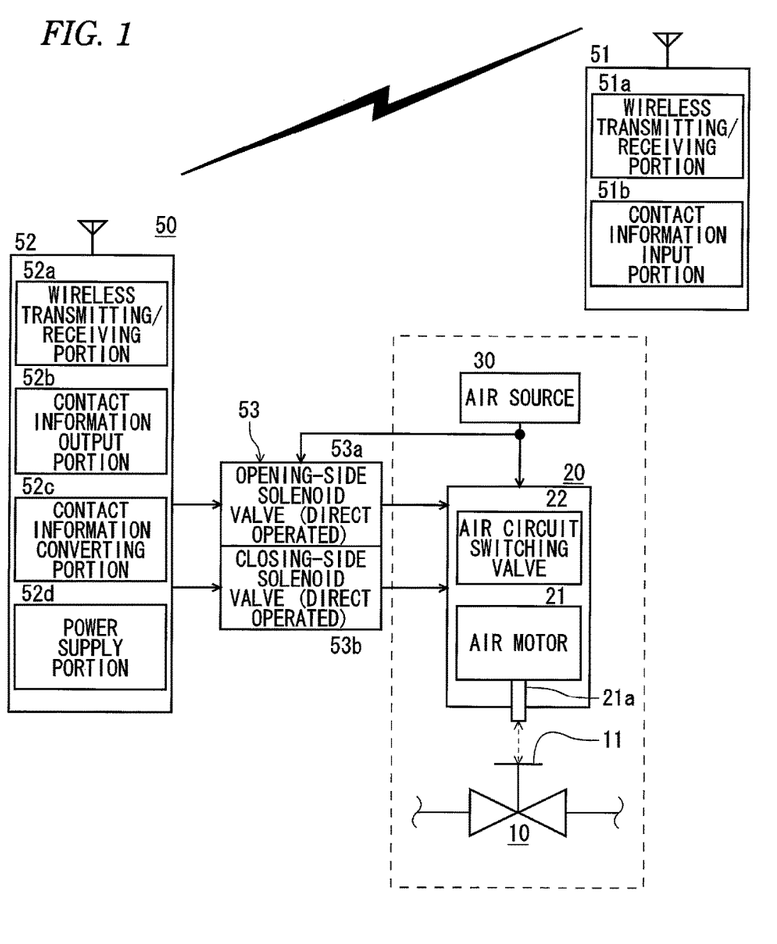
FIG. 1 is a configuration diagram of an embodiment of a valve remote control apparatus according to the invention.

FIG. 1 is a configuration diagram of an embodiment of a valve remote control apparatus according to the invention. Each common part of FIGS. 1 and 11 is designated with the same reference numeral.

In FIG. 1, the automatic switch 20 attached to the existing manual valve 10 is remotely controlled by a wireless operating system 50. The wireless operating system 50 is configured by a contact information terminal portion 51 operated at a place distant from the installation site of the manual valve 10 and the automatic switch 20, and a contact information operating portion 52 and an operating valve 53 which are provided around the installation site of the manual valve 10 and the automatic switch 20.

The contact information terminal portion 51 includes a wireless transmitting/receiving portion 51a, and a contact information input portion 51b. The contact information terminal portion 51 transmits and/or receives wirelessly operations signals to and from the contact information operating portion 52. Incidentally, a power supply portion for driving the contact information terminal portion 51 is not shown.

The contact information operating portion 52 includes a wireless transmitting/receiving portion 52a, a contact information output portion 52b, a contact information converting portion 52c, and a power supply portion 52d. The contact information operating portion 52 opens and closes the operating valve 53, based on operation signals transmitted and/or received wirelessly to and from the contact information terminal portion 51.

The operating valve 53 is configured by an opening-side solenoid valve 53a, and a closing-side solenoid valve 53b. A drive control air pressure input from the air source 30 is supplied via the opening-side solenoid valve 53a to the opening-side of the air circuit switching valve 22 and also supplied via the closing-side solenoid valve 53b to the closing-side of the air circuit switching valve 22. Incidentally, a direct-operated solenoid valve adapted to drive directly a valve by excitation of a solenoid coil is used as each of the opening-side solenoid valve 53a and the closing-side solenoid valve 53b.

If the air motor 21 in such a configuration is caused to turn to the opening-side, contact information for turning on an opening-side solenoid valve drive signal Sop to be input from the contact information output portion 52b to the opening-side solenoid valve 53a is transmitted via the wireless transmitting/receiving portions 51a and 52a from the contact information input portion 51b of the contact information terminal portion 51 to the contact information operating portion 52.

The contact information operating portion 52 provided around the installation site of the manual valve 10 and the automatic switch 20 is such that when the wireless transmitting/receiving portion 52a receives wireless information, the contact information output portion 52b recognizes the turn-on of the opening contact information in the wireless information and causes the transition of the opening contact information to be output to an on-state.

The contact information converting portion 52c converts the opening contact information into an opening-side solenoid valve drive signal Sop whose voltage/current (e.g., a direct-current (DC) 24 volts (V)/0.33 amperes (A)) is set to be able to drive the opening-side solenoid valve 53a.

When the opening-side solenoid valve 53a is driven by the turn-on of the opening-side solenoid valve drive signal Sop, a drive control air pressure input from the air source 30 is supplied to the opening-side of the air motor 21. Thus, the air motor 21 turns in an opening-direction, so that the manual valve 10, whose manual operating portion 11 is mechanically connected to the output shaft 21a of the air motor 21, is gradually opened to the opening-side.

Incidentally, a time needed to fully open the manual valve 10 is preliminarily known. After the lapse of the time, the contact information input portion 51b of the contact information terminal portion 51 transmits a control signal for turning off the opening-side solenoid valve drive signal Sop. Consequently, the opening contact information is turned off, so that the opening-side solenoid drive signal Sop is also turned off. Thus, the rotation of the air motor 21 is stopped, and the manual valve 10 is stopped in an open state.

Also, regarding the closing-side, the closing contact information and the closing-side solenoid valve drive signal Scl are varied by following a similar procedure. Thus, the air motor 21 is driven to the closing-side, and the manual valve 10 is put into a closed state.

Consequently, the manual valve provided as the tank main valve can be remotely and wirelessly controlled. When a disaster such as an earthquake or a tsunami occurs, the tank main valve can be quickly closed.

Accordingly, laying the control signal line 43 from the instrumental-panel 42 to the operating panel 41 provided in the vicinity of the tank main valve (manual valve) 10 in the conventional case is unnecessary. Even if the number of tank main valves (manual valves) 10 serving as operation objects is large, the control signal lines are not congested. The maintenance and management man-hours of the control signal lines are not generated.

Incidentally, because a direct-operated solenoid valve is used in the above embodiment as the operating valve (solenoid valve) 53 driving the automatic switch 20, it is necessary to maintain the on-state of the opening-side solenoid valve drive signal Sop or the closing-side solenoid valve drive signal Scl while the air motor 21 is made to run.

However, as described above, the opening-side solenoid valve drive signal Sop or the closing-side solenoid valve drive signal Scl needs electric power of, e.g., 24 V*0.33 A≈8 watts (W). If a battery is used as the power supply portion 52d of the contact information operating portion 52 to maintain this electric power while the manual valve 10 is operated (e.g., several seconds to 1 minute or more in a longer case), there is a battery life problem.

Figure 2:
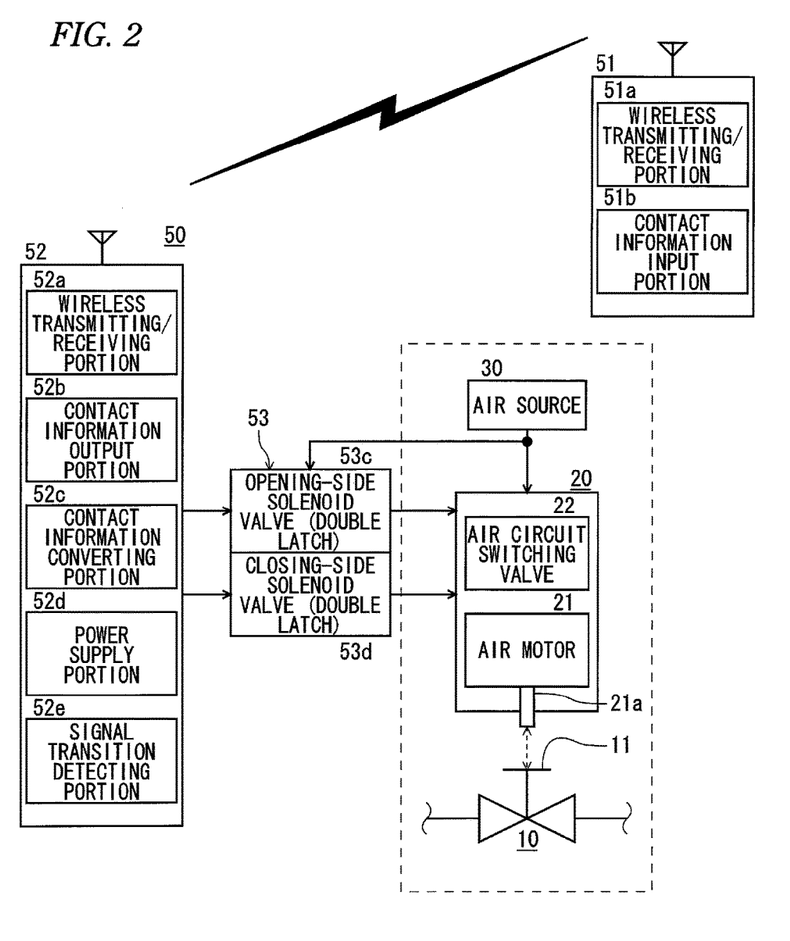
FIG. 2 is a configuration diagram illustrating another embodiment of the invention.

This problem can be solved by changing the direct-operated solenoid valve used as the operating valve 53 to a double latch solenoid valve as illustrated in FIG. 2. If double latch solenoid valves 53c and 53d are used as the operating valve 53, a predetermined drive current is supplied only when the transition of the state of the double latch solenoid valves 53c and 53d is performed. For example, in the case of using 24V DC solenoid valves, the transition of the state of each solenoid valve can be achieved by supplying 0.26 A of a current to each solenoid valve for 0.5 seconds.

FIG. 2 is a configuration diagram illustrating another embodiment of the invention, which is an example using the double latch solenoid valves 53c and 53d as the operating valve 53. Each common part of FIGS. 1 and 2 is designated with the same reference numeral. In FIG. 2, a signal transition detecting portion 52e detects a condition in which the state of the contact information transits from an on-state to an off-state or from the off-state to the on-state, and turns on an opening-side solenoid valve drive signal Sop or a closing-side solenoid valve drive signal Scl for an optional predetermined time (0.5 seconds in this embodiment) from a transition time-point.

Consequently, in the case of using a battery as the power supply portion 52d of the contact information operating portion 52, the life of the battery can considerably be extended.

Figure 3:
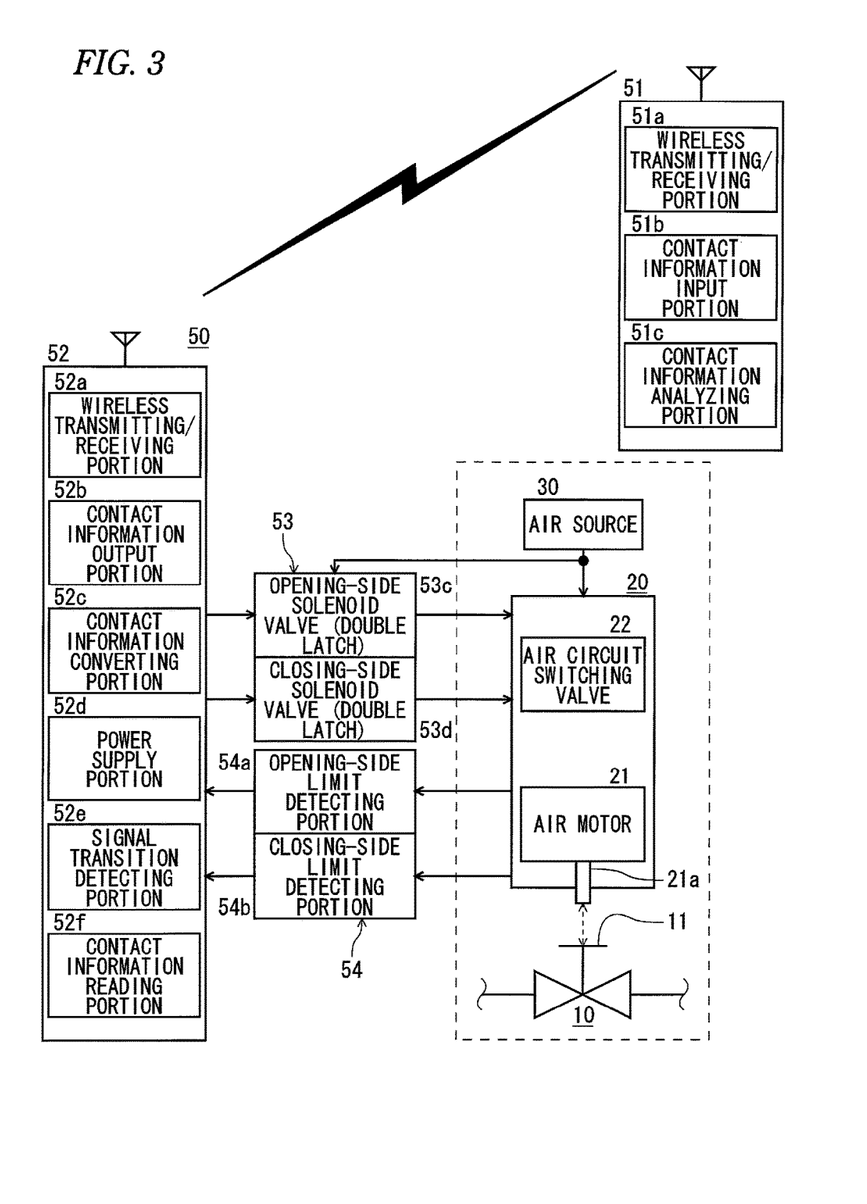
FIG. 3 is a configuration diagram illustrating another embodiment of the invention.

FIG. 3 is a configuration diagram illustrating another embodiment of the invention. Each common part of FIGS. 2 and 3 is designated with the same reference numeral. In FIG. 3, the automatic switch 20 is provided with a limit switch (not shown) detecting the full-open and the full-close states of the air motor 21. In addition, a limit detecting switch 54 for detecting a limit control air pressure output from the limit switch is externally attached to the automatic switch 20.

Further, a contact information reading portion 52f for reading contact information output from the limit detecting switch 54 is added to the contact information operating portion 52. A contact information analyzing portion 51c for analyzing contact information read to the contact information reading portion 52f is added to the contact information terminal portion 51.

An opening-side limit detecting switch 54a detects a limit control air pressure output from the opening-side limit switch to thereby convert this air-pressure into a contact signal. A closing-side limit detecting switch 54b detects a limit control air pressure output from the closing-side limit switch to thereby convert this air-pressure into a contact signal.

The contact signals output, as a result of conversion, from the opening-side limit detecting switch 54a and the closing-side limit detecting switch 54b are read to the contact information operating portion 52 by the contact information reading portion 52f, and transmitted to the contact information analyzing portion 51c via the wireless transmitting/receiving portion 52a and the wireless transmitting/receiving portion 51a of the contact information terminal portion 51.

When the contact information analyzing portion 51c of the contact information terminal portion 51 confirms that the contact information associated with the limit control air pressure is turned on, the contact information analyzing portion 51c performs a feedback-operation to thereby cause the transition of the state of the contact information to an off-state.

Thus, this embodiment is configured to cause the transition of the state of each of the opening contact information and the closing contact information respectively obtained at the detection of the full-open state and at the detection of the full-close state of the air motor 21 to an off-state. Thus, the full-open state and the full-close state can accurately be confirmed. In addition, inversion starting characteristics to the opposite direction can be improved.

Figure 4:
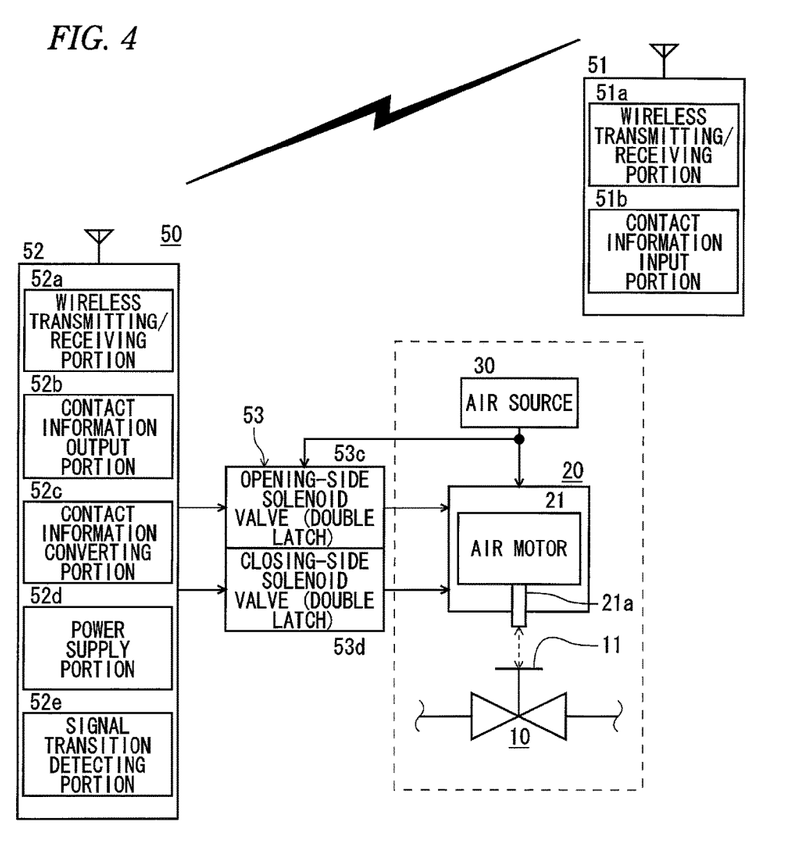
FIG. 4 is a configuration diagram illustrating another embodiment of the invention.

FIG. 4 is also a configuration diagram illustrating another embodiment of the invention. Each common part of FIGS. 2 and 4 is designated with the same reference numeral. In FIG. 4, the air motor 21 of the automatic switch 20 is directly driven by an air pressure output from the double latch solenoid valve 53c and 53d used as the operating valve 53.

Consequently, the air circuit switching valve 22 of the automatic switch 20 can be omitted. Thus, the low cost of the apparatus can be achieved.

Incidentally, when the apparatus is used in a hazardous area, the contact information terminal portion 51, the contact information operating portion 52, the operating valve 53, and so on are adapted to be explosion-proof, such as flame-proof or intrinsically safety explosion-proof, if necessary.

In each of the above embodiments, an example of incorporating the wireless transmitting portion and the contact information converting portion into the contact information operating portion 52 and integrating these portions into one unit has been described. However, the wireless transmitting portion and the contact information converting portion may be configured separately from each other, if necessary.

Figure 5:
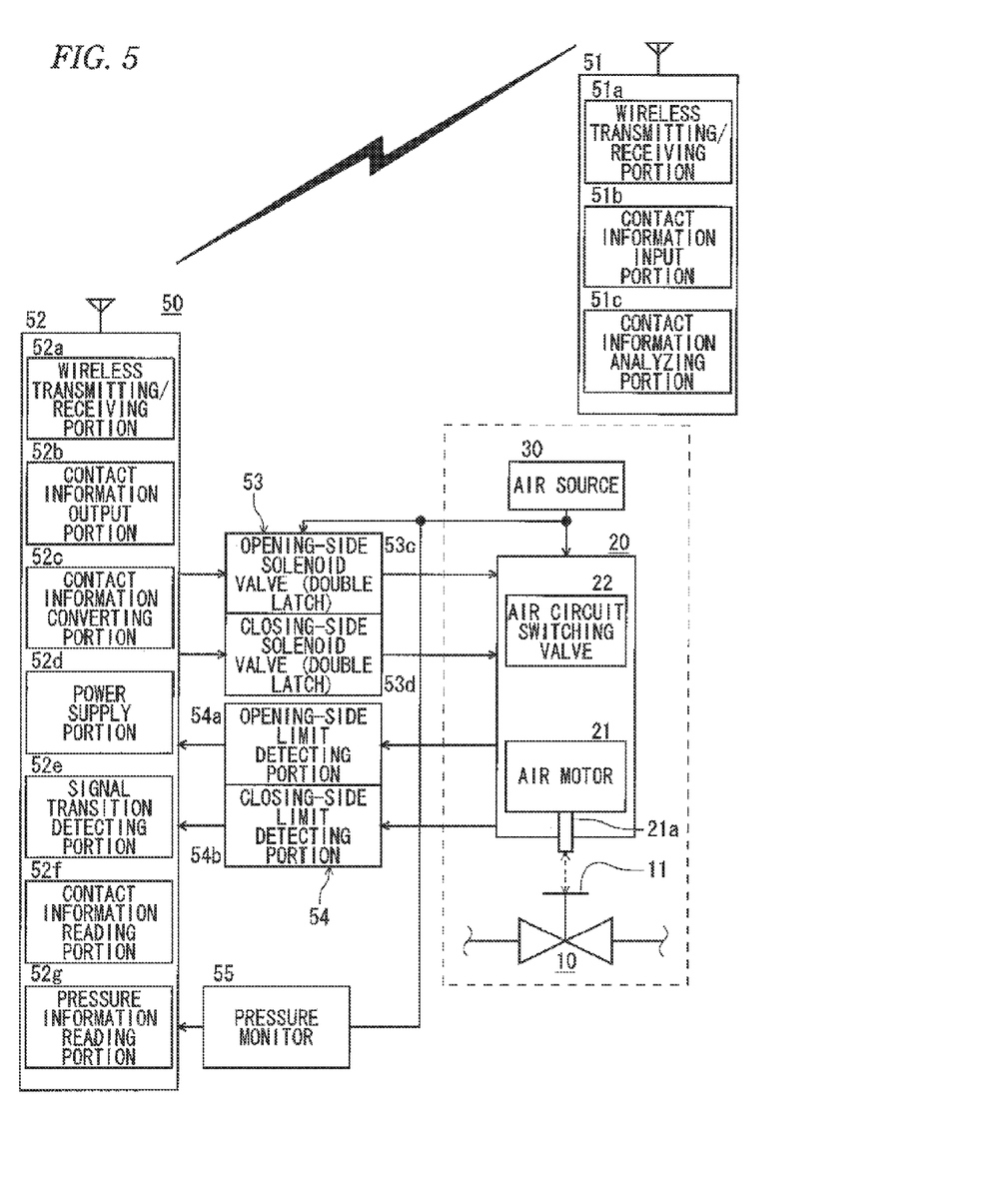
FIG. 5 is a configuration diagram illustrating another embodiment of the invention.

Further, this embodiment may be modified such that the air pressure of the air source 30 of the air motor 21 illustrated in FIG. 3 is measured by a pressure monitor 55 such as a pressure sensor and a pressure switch, as illustrated in FIG. 5.

In FIG. 5, the pressure monitor 55 measures the air pressure of the air source 30 and inputs a measurement value to a pressure information reading portion 52g. The pressure information reading portion 52g outputs an alert when the measurement value of the pressure measured by the pressure monitor 55 is deviated from a preliminarily set value.

Consequently, if the air pressure of the air source 30 lowers for some reason, an appropriate reaction can be taken.

Figure 6:
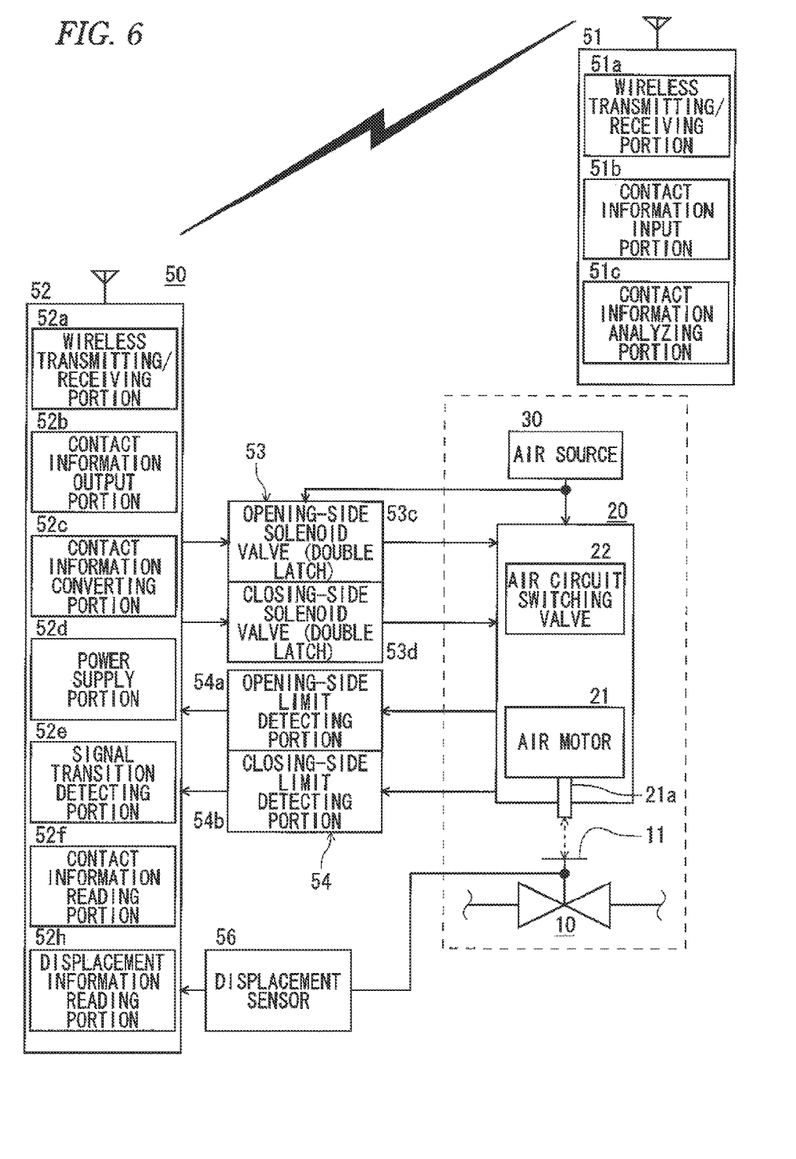
FIG. 6 is a configuration diagram illustrating another embodiment of the invention.

Further, after the solenoid valve is operated by an operation signal, an operating condition of the manual valve 10 can be checked and diagnosed by detecting an amount of displacement of the manual valve 10 driven by the air motor 21 illustrated in FIG. 3, using a displacement sensor 56, as illustrated in FIG. 6.

In FIG. 6, the displacement sensor 56 such as a potentiometer is attached to the manual operating portion 11 of the manual valve 10. The angle, the rotational speed, the valve axis vertical movement and so on of the manual valve 10 are detected using the displacement sensor 56. A detection output of the displacement sensor 56 is input to a displacement information reading portion 52h. The displacement information reading portion 52h checks, based on the detection output of the displacement sensor 56, whether the manual valve 10 actually operates when the operation signal is output from the manual valve 10.

Consequently, even if the valve is neither fully closed nor fully opened, an operation of the apparatus can be checked by causing the air motor 21 to operate only in a short time and detecting the displacement at that time as a diagnostic method of the valve remote control apparatus.

Figure 7:
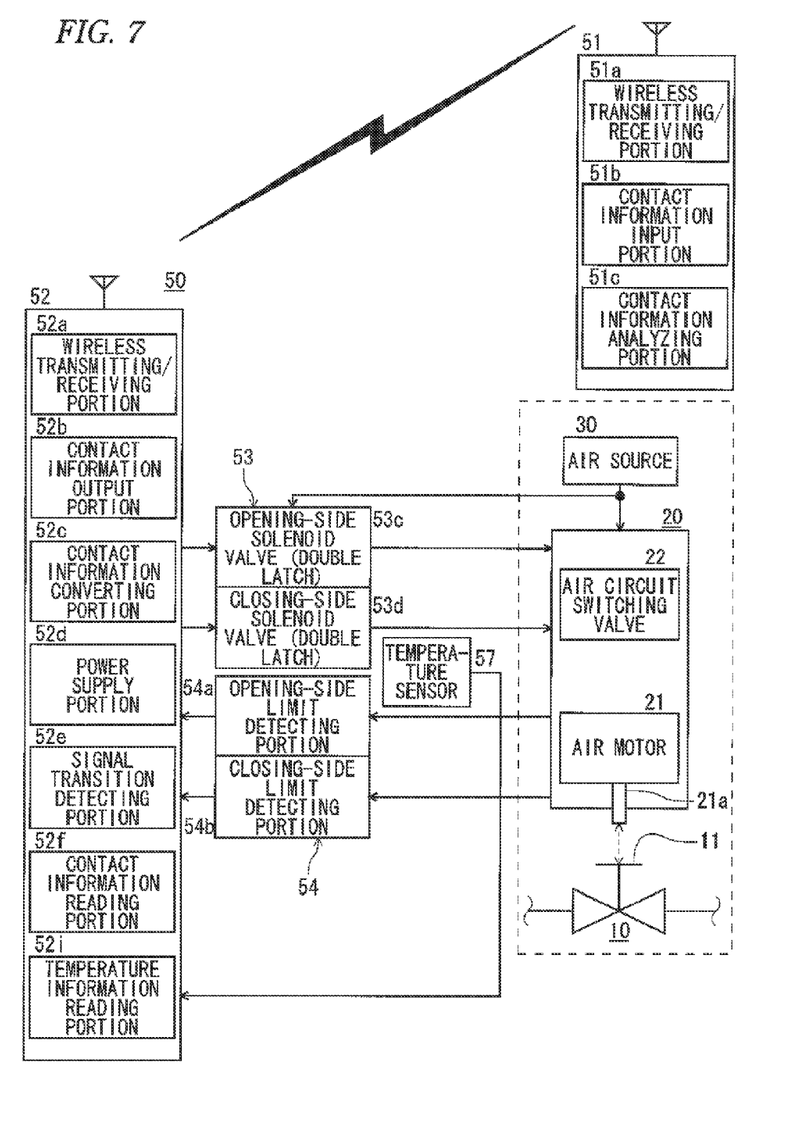
FIG. 7 is a configuration diagram illustrating another embodiment of the invention.

Further, when the ambient temperature of the valve remote control apparatus illustrated in FIG. 3 is deviated from the operation temperature range of the operating valve (solenoid valve) 53 and the like, a warning can be issued by detecting the ambient temperature, as illustrated in FIG. 7.

In FIG. 7, the operation temperature range of the operating valve (solenoid valve) 53 is, e.g., −5 degrees centigrade (° C.) to 50° C. If the ambient temperature is deviated from this temperature range, it is expected that the operating valve cannot operate normally. Thus, the ambient temperature of the valve remote control apparatus is detected using a temperature sensor 57. Then, the temperature signal of the temperature sensor 57 is input to a temperature information reading portion 52i.

Consequently, the temperature signal of the temperature sensor 57 is deviated from the preset temperature range, a predetermined temperature warning is issued.

Figure 8:
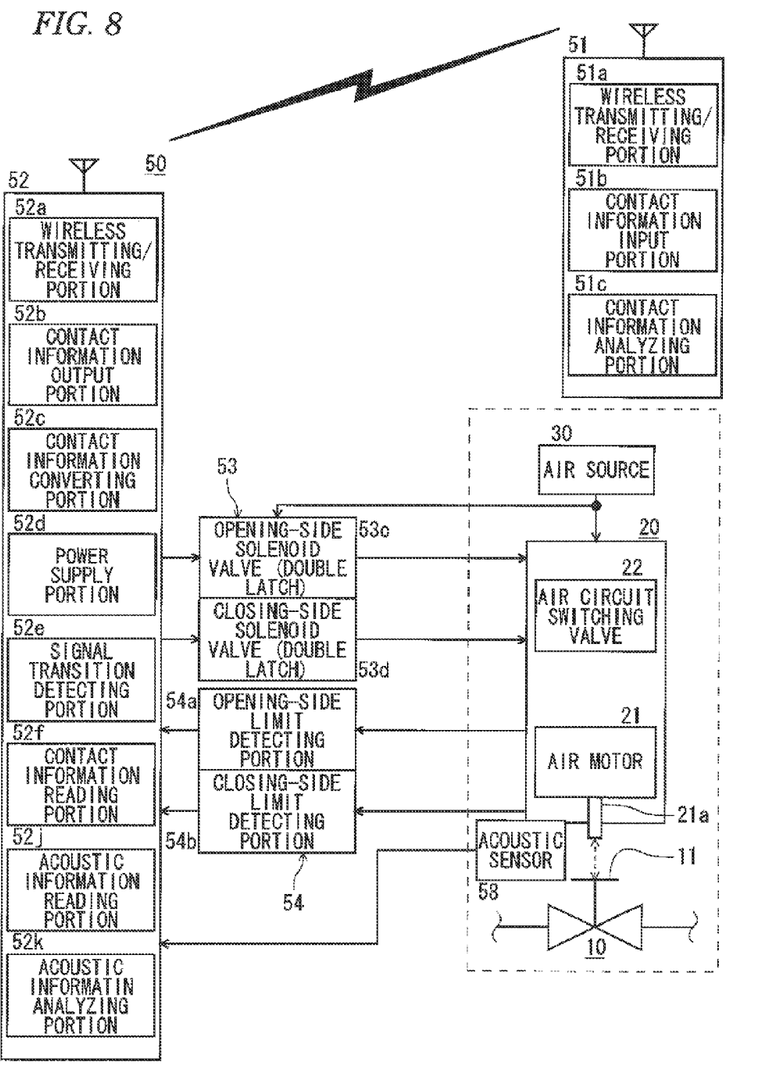
FIG. 8 is a configuration diagram illustrating another embodiment of the invention.

Further, the state of the air motor 21 can be diagnosed by detecting the operating sound of the air motor 21 of the valve remote control apparatus illustrated in FIG. 3 using an acoustic sensor 58 such as a microphone, as illustrated in FIG. 8, and analyzing acoustic information.

In FIG. 8, the air motor 21 generates specific sounds during operation. Thus, the operating sound generated during the normal operation of the air motor 21 is detected by the acoustic sensor 58 and preliminarily read to an acoustic information reading portion 52j. The detected sound is preliminarily analyzed and recorded by an acoustic information analyzing portion 52k. Then, sounds generated when the air motor 21 is operated in a short time are detected by the acoustic sensor 58. The detected sounds are read to the acoustic information reading portion 52j and analyzed by the acoustic information analyzing portion 52k. Further, a result of this analysis is compared with the result of analyzing and recording the sound generated during the normal operation. Accordingly, it can appropriately be determined whether the operating condition of the air motor 21 is normal.

Figure 9:
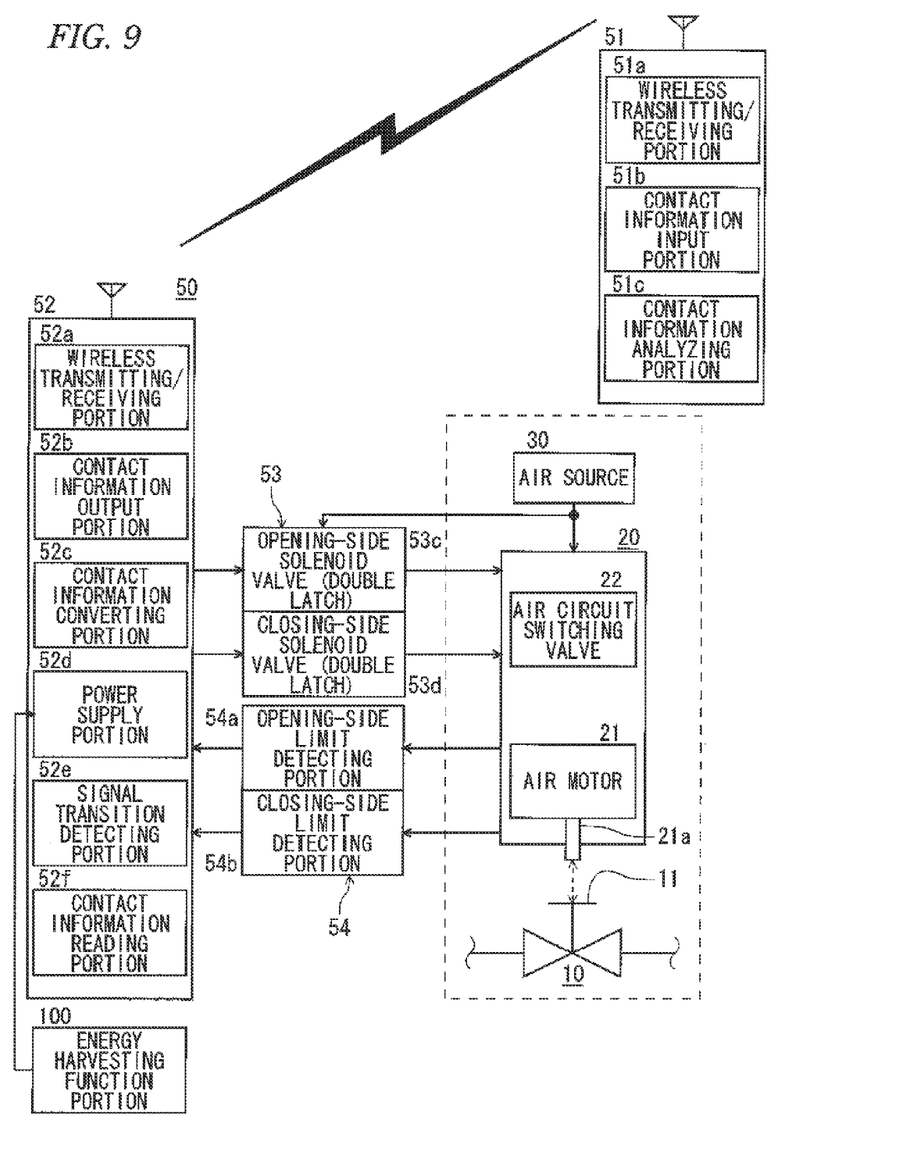
FIG. 9 is a configuration diagram illustrating another embodiment of the invention.

Further, as illustrated in FIG. 9, electric-power may be supplied to the power supply portion 52d of the valve remote control apparatus illustrated in FIG. 3 from an energy harvesting function portion 100 such as a solar battery.

In FIG. 9, the valve remote control apparatus is operated using the battery. Thus, the monitoring of the battery life, and the periodic replacement of the battery are needed. In contrast, the utilization of the energy harvest function portion 100, such as a solar battery, a seismic power generator, and a temperature difference power generator, can extend the life of the battery and eliminate the necessity of a relatively-short-period replacement of the battery.

Figure 10:
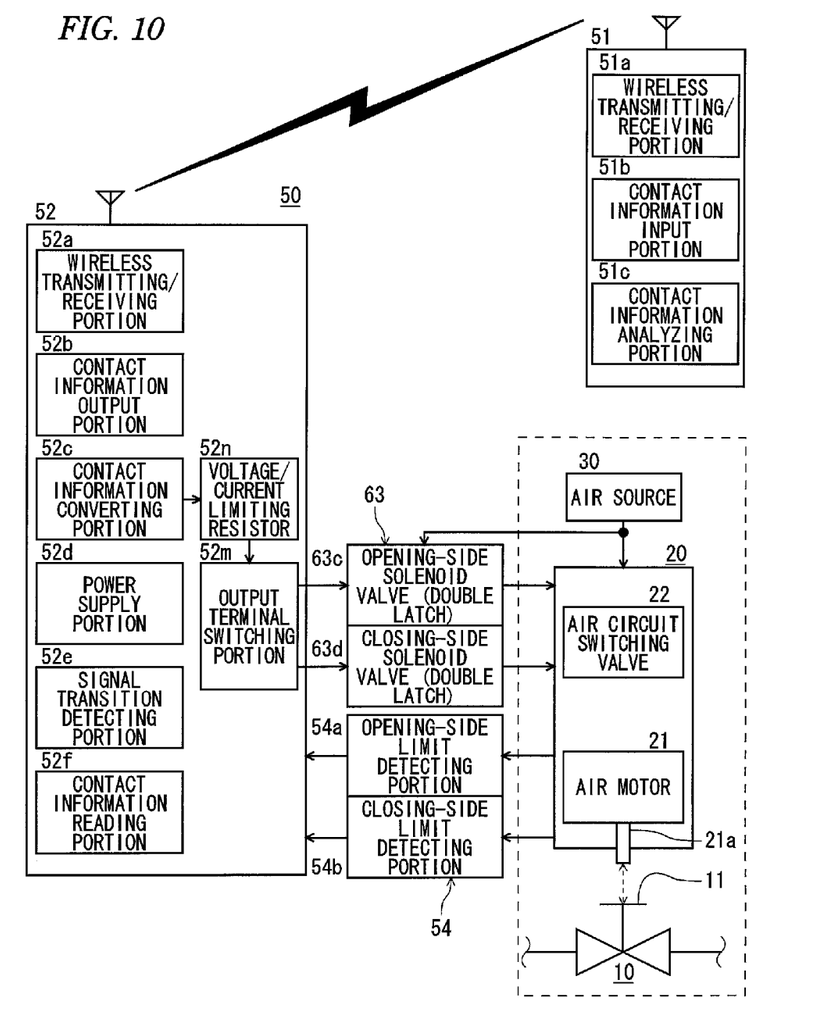
FIG. 10 is a configuration diagram illustrating another embodiment of the invention.

In addition, the electric circuit of the valve remote control apparatus may be adapted to be intrinsically safety explosion-proof, using, as illustrated in FIG. 10, intrinsically safety explosion-proof solenoid valves 63c and 63d as the solenoid valves of the valve remote control apparatus illustrated in FIG. 3. Further, a single intrinsically-safety-explosion-proof voltage/current limiting resistor 52n may be provided in a rear stage of the contact information output portion. The destination of the output of the voltage/current limiting resistor 52n may be switched by an output terminal switching portion 52m.

In FIG. 10, two solenoids are provided in each of the double latch intrinsically safety explosion-proof solenoid valves 63c and 63d. The direction of the air circuit switching valve 22 for each solenoid valve can be switched by passing a current through each of the solenoids substantially exclusively for about 1 second. This embodiment includes two intrinsically safety explosion-proof solenoid valves 63c and 63d. Therefore, a total number of solenoids is four. The function of the valve remote control apparatus can be achieved by driving all of the four solenoids exclusively.

Further, the products of the intrinsically safety explosion-proof solenoid valves are commercially available. Thus, if the electric circuit of the valve remote control apparatus is designed to be adapted to be intrinsically safety explosion-proof, an intrinsically safety explosion-proof valve remote control apparatus can be realized.

It is requested for explosion-protection not to apply, to each intrinsically safety explosion-proof solenoid valve, a voltage and a current which exceed predetermined values, respectively. Thus, usually, a single voltage/current limiting device is needed for one solenoid. However, because the number of solenoids to be driven at a time is only one, it is redundant to prepare four voltage/current limiting devices. Thus, the single voltage/current limiting resistor 52n is incorporated in the wireless operating system 50. An output of the voltage/current limiting resistor 52n is selectively connected via the output terminal switching portion 52m to a terminal to which a solenoid to be supplied with a current is connected. Incidentally, the output terminal switching portion 52m is also incorporated into the wireless operating system 50 and is driven by remote control.

Consequently, it is sufficient to use only one voltage/current limiting resistor that serves as a factor of increasing a footprint.

As described above, according to the invention, the automatic switch to be added to the manual valve can be driven and controlled by a wireless signal. If the manual valve is used as a tank main valve, the tank main valve can quickly be driven and rotated in a safe direction when a disaster such as an earthquake or a tsunami occurs.

The foregoing description shows only specific preferred embodiments for the purpose of describing and exemplifying the invention. Accordingly, it should be understood that the invention is not limited to the above embodiments, and that the invention may include many variations and modifications without departing from the spirit and scope thereof.

This application is based on Japanese Patent Application (Patent Application No. 2012-117719) filed on May 23, 2012, and Japanese Patent Application (Patent Application No. 2013-029888) filed on Feb. 19, 2013, the contents of which are incorporated herein by reference.

DESCRIPTION OF REFERENCE NUMERALS AND SIGNS 10 manual valve (tank main valve)
20 automatic switch
21 air motor
21a output shaft
30 air source
50 wireless operating system
51 contact information terminal portion
51a wireless transmitting/receiving portion
51b contact information input portion
51c contact information analyzing portion
52 contact information operation portion
52a wireless transmitting/receiving portion
52b contact information output portion
52c contact information converting portion
52d power supply portion
53 operating valve
53a, 53c opening-side solenoid valves
53b, 53d closing-side solenoid valves
54 limit detecting switch
54a opening-side limit detecting switch
54b closing-side limit detecting switch

The invention claimed is:

1. A valve remote control apparatus configured to mechanically connect, to a manual operating portion of an existing manual valve, an output shaft of an air motor configured to rotate using an air pressure as a drive source, and to remotely control the manual valve, the valve remote control apparatus comprising:
   a solenoid valve operated by an operation signal transmitted and received wirelessly between a contact information terminal portion and a contact information operating portion;
   a discrete limit switch that detects linear position by detecting an end position, the discrete limit switch configured to detect a full-open state and a full-close state of the air motor, and to output contact information,
   wherein the air pressure for driving and rotating the air motor is supplied via the solenoid valve,
   wherein the contact information operating portion includes a contact information reading portion configured to read the contact information output, and
   wherein the contact information terminal portion includes a contact information analyzing portion configured to cause, when confirming that the contact information read to the contact information reading portion is turned on, transition of the contact information to an off-state.

2. The valve remote control apparatus according to claim 1, wherein
   the contact information operating portion includes a module configured to convert contact information transmitted from the contact information terminal portion into an electric signal capable of driving the solenoid valve.

3. The valve remote control apparatus according to claim 1, wherein the solenoid valve is a double latch type solenoid valve.

4. The valve remote control apparatus according to claim 1, further comprising:
   an intrinsically safety explosion-proof solenoid valve used as the solenoid valve;

a single-system voltage/current limiting portion configured to limit each of a voltage and an current, which drive a solenoid of the intrinsically safety explosion-proof solenoid valve, not to exceed a value predetermined for intrinsically safety explosion protection; and an output terminal switching portion configured to selectively connect, to a terminal of the solenoid to be driven, a predetermined output limited by the voltage/current limiting portion.

5. The valve remote control apparatus according to claim 1, further comprising at least one of:

a pressure monitor configured to measure an air pressure serving as the drive source;

a displacement sensor configured to detect displacement of the manual valve;

a temperature sensor configured to detect ambient temperature of the solenoid valve;

a module configured to detect an operating sound of the air motor and to analyze acoustic information concerning the detected operating sound; and an energy harvesting function portion configured to serve as a power supply complementing a battery driving each of the portions.

* * * * *